United States Patent [19]
Kugell et al.

[11] Patent Number: 5,751,794
[45] Date of Patent: May 12, 1998

[54] PROACTIVE VOICE MAIL SERVICE

[75] Inventors: Stanley Kugell, Newton Highlands; David Friend, Boston, both of Mass.

[73] Assignee: Faxnet Corp., Boston, Mass.

[21] Appl. No.: 706,477

[22] Filed: Sep. 4, 1996

[51] Int. Cl.⁶ .................................................. H04M 1/64
[52] U.S. Cl. .............................. 379/89; 379/211; 379/77
[58] Field of Search ................................. 379/67, 88, 89, 379/77, 201, 210, 211, 212, 213

[56] References Cited

U.S. PATENT DOCUMENTS 4,625,081  11/1986  Lotito et al. .................................. 379/88
5,134,647  7/1992  Pugh et al. .................................... 379/88

*Primary Examiner*—Fan S. Tsang
*Attorney, Agent, or Firm*—Sprung Kramer Schaefer & Briscoe

[57] ABSTRACT

A method for providing a proactive voice mail service wherein a message is recorded by a voice mail server if the customer's phone line is busy or does not answer and the voice mail server then attempts to deliver the message proactively to the customer. The method avoids loop-back charges which limit the usefulness of present implementations of proactive voice mail and allow for a nation-wide proactive voice mail service utilizing a server with toll-free inbound phone lines.

3 Claims, 6 Drawing Sheets

PROACTIVE VOICE MAIL SERVICE

BACKGROUND OF THE INVENTION

The present invention relates to two methods of providing voice mail service that allows a voice mail server to proactively call the customer to deliver messages. Most voice mail systems require that the customer dial into a voice server to check and retrieve stored messages. A proactive voice mail server does not wait for the customer to dial in, but calls the customers phone automatically as soon as the customer's phone line is free.

Most voice mail systems will record a message if the customer's phone line is either in use or does not answer. In either case, the voice mail server answers the phone and records the message. A proactive voice mail system then attempts to call the customer to deliver the message. The present invention overcomes a major drawback of existing schemes for implementing proactive voice mail service. This major drawback is known as "loop-back-to-server," or simply "loop-back." There is a cost associated with loop-back which limits the economic viability of present proactive voice mail services.

In order to forward telephone calls to the voice mail server when the customer is on the phone or does not answer, the customer's local telephone company is instructed to apply a commonly available feature to the customer's phone line called "forward on busy/no-answer."

The voice mail server answers the incoming call and stores it on its computer hard disk. The phone number of the caller is obtained automatically from the phone company using a feature called "feature group D" which is similar to "caller ID." Feature group D is available to registered long distance carriers. Other schemes exist for identifying the phone number of the caller, the most popular of which is assigning a separate DID number for each customer. For example, Customer A's phone line can be set to forward calls on busy to phone number 234-5678 at the voice mail server. There would be one such number for every customer. If the server receives a call on line 234-5678, then it knows that it is Customer A's call that is being forwarded. It can then look up Customer A's phone number so that it can try proactively delivering the voice mail.

In present implementations of proactive voice mail, once the message has been received and stored, the server repeatedly calls the customer's line until it finds it free, at which point it delivers the message when the customer answers. The loop-back problem comes into play when the server calls the customer's line and the server's call is forwarded back to the server because the customer's line is still busy. Existing services cannot distinguish between a call forwarded from a third party versus a call looping back from the server itself. In order to identify that the caller is actually the server itself, the server must answer the call and identify itself with a signal.

Because this method of identifying the calling party requires answering the incoming call, a charge is incurred for the phone call from the server to the customer's line and from the customer's line back to the server. If the server is forced to attempt delivery multiple times before finding the customer's line free, the costs associated with the loop-back can render such service economically impractical.

In order to avoid loop-back charges, present implementations are restricted to those geographic areas known as "free-calling zones." In a free calling zone, there is no incremental charge for a local call. Hence, even though a call is completed in order to determine if the customer's line is still busy, there is no charge for such call. This means that the server's inbound phone number must be a free local call for all customers.

However, there are only a limited number of free calling zones and the geography of these zones can be changed at any time by local phone companies. Many free calling zones are presently too small to be economically viable. Any time never-busy service is extended beyond a free-calling zone, loop-back charges are incurred and the service may become economically impractical. Because of the costs associated with long-distance charges (including toll-free numbers), wide-area proactive voice mail is not practical using conventional methods.

The economics of the loop-back charges precludes the service provider from attempting frequent retries because a cost is incurred with each retry. Since the retry schedule is the principle determinant of the quality of the service, loop-back charges have a direct effect on the quality of the service provided.

SUMMARY OF THE INVENTION

The main object of the present invention is to provide methods of delivering voice mail service without incurring loop-back charges.

A further object of the present invention is to employ a digital or analog signature in the ring-back signal in order to allow a server to recognize when a call is being forwarded back to itself.

A still further object of the present invention is to utilize the capabilities of Signaling System 7 (SS7) to test the status of a line prior to making an actual call, thereby avoiding loop-back charges.

Another object of the present invention is to provide a method of delivering proactive voice mail service on a nation-wide basis from a central location by forwarding calls to a toll-free nationwide number and utilizing one of the methods described herein to provide retries without incurring loop-back charges.

The present invention utilizes a digital or analog signature imbedded in the ring-back tone issued by the server upon receiving an incoming call. The ring-back tone is the sound which one normally hears indicating that the called party's phone line is ringing (as opposed to busy). The ring-back tone is generated by the telephone equipment that is the last link in the chain of switches that connects the call originator to the destination. If the server's ring-back tone can be made unique so that the server can identify when a call is being forwarded back to the server, then a call can be dropped before it is answered, thereby avoiding the loop-back charge.

In a normal telephone call, the "ring-back tone" which the caller hears originates at the called party's local phone company, or with the telephone switches and equipment at the called party's premises. The present invention calls for the voice mail server to generate a "ring-back tone" which includes a sequence of bits (called a "signature") which uniquely identifies the server's ring-back tone. This sequence of bits can be identified by the caller using either digital or analog methods.

To enable the proactive voice mail service, the customer's line is programmed by the local phone company so that if the line is busy or no-answer, the incoming call is automatically forwarded to the phone number for the voice mail server. The server receives the incoming call and stores it on a computer mass storage device, such as a hard drive or optical disk drive.

The server then commences a retry schedule to attempt delivery of the message to the customer. When the server dials the customer's phone number to attempt delivery of a stored message, the call will be forwarded back to the server if the destination line is still busy. However, the server can recognize that it is calling itself by recognizing the signature in the ring tone. The server can then disconnect before answering the call and therefore incur no loop-back charges.

The avoidance of the loop-back charges makes it possible to offer proactive voice mail service on a nationwide basis from one centralized server. In accordance with the present invention, a customer's phone line can be set to forward calls on busy to a nationwide toll-free number. This toll free number terminates at the central server. The server makes a long distance call to attempt delivery of the message. By avoiding loop-back charges including both the toll-free incoming call and the long distance retry call, it is economically practical to provide proactive voice mail service on a nationwide basis using one or more central servers.

Another way to implement proactive voice mail without incurring loop-back charges involves the use of Signaling System 7 (SS7). SS7 is the digital signal protocol used by most phone companies worldwide that allows telephone switches to exchange information concerning the routing of individual telephone calls. One of features generally supported by SS7 is the ability to determine if a particular telephone number is busy without actually making a call to that number. In accordance with the present invention, SS7 can be used to test a phone number nearly anywhere in the world in a fraction of a second. If the destination's phone number is found to be free, then SS7 sets up and completes a call from the server to the customer in order to deliver stored messages.

This method of implementing proactive voice mail has the advantage of being very fast. It takes less than one second to verify that a particular phone line is still busy. And since there is no incremental cost for repeatedly testing the status of a phone line, the tests can be repeated frequently with the result that the stored message will be delivered almost the instant that the customer's line becomes free.

Further in accordance with the present invention, an alternative use of SS7 to implement proactive voice mail uses SS7's capability to automatically monitor the status of a line and then notify the caller as soon as the customer's phone line hangs up. When using this feature of SS7, the server makes one query, asking SS7 to notify the server as soon as the customer's phone line is free. Once the server receives notification that the line is free, the call is completed. Using this capability of SS7 avoids having to repeatedly query the status of the customer's line, thereby freeing up processing time on the server for other tasks.

These embodiments for using SS7 to test the status of the customer's phone line without incurring a loop-back charge are representative of specific ways of using SS7 that will vary in different parts of the country or the world, depending on the specific implementations of SS7 in use by the different phone companies in those locations.

These and other features of the present invention will become more apparent from the detailed description of the invention with reference to the attached drawings, wherein

DETAILED DESCRIPTION OF THE INVENTION

Figure 1:
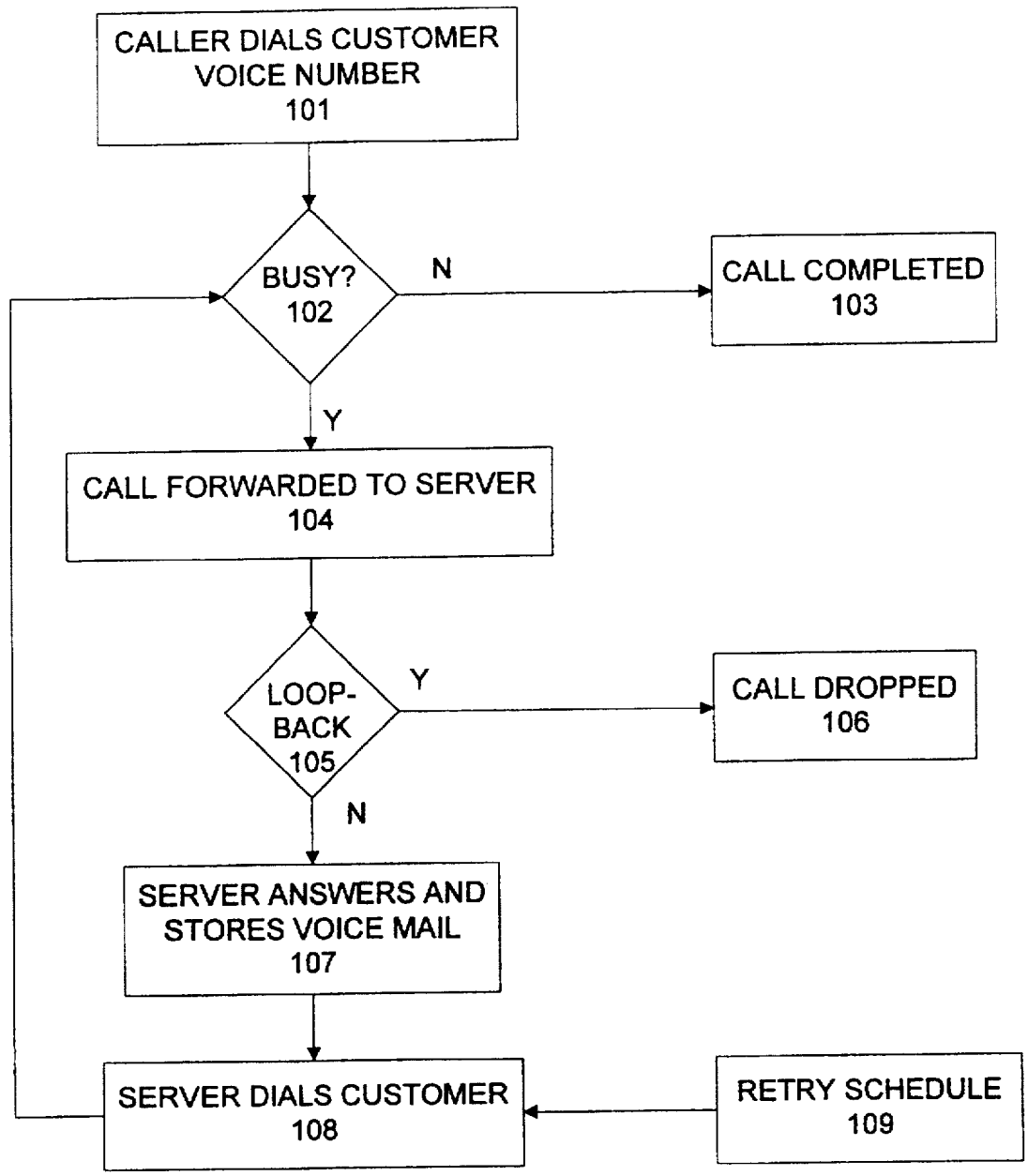
FIG. 1 is a flow chart showing the flow of events in a proactive voice mail service implemented according to the present invention.

Referring to FIG. 1, a system according to the present invention is shown wherein proactive voice mail service is implemented using loop-back detection to avoid loop-back charges.

The caller initiates a call at 101 to the customer's line, on which the proactive voice mail service has been enabled. If the customer's line is not busy, the call is completed at 103. If the customer's line is busy at 102, the local phone company's "forward on busy" feature at 104 automatically forwards the call to a server, whose phone number has been supplied to the local phone company. This number can be either a local phone number or a toll-free number. Using a toll-free number allows the proactive voice mail service to be provided on a nation-wide basis from one or more central server locations.

The server, upon detecting an incoming call, initiates a loop-back test at 105 to determine if the incoming call has originated with a caller or with the server. If the loop-back test at 105 detects that the incoming call originated at the server, the call is dropped at 106.

If the loop-back test at 105 determines that the incoming call is not originating with the server, then the server answers the call at 107, receives the incoming message, and stores it on the server's mass storage device.

In accordance with a retry schedule at 109, the server attempts delivery of the stored message at 108 to the customer. If the customer's line is still busy at 102, the process is repeated until the call is successfully completed or until the retry schedule is exhausted. Once the retry schedule is exhausted, the server must wait for the customer to dial into the voice mail system and retrieve messages passively.

Figure 2:
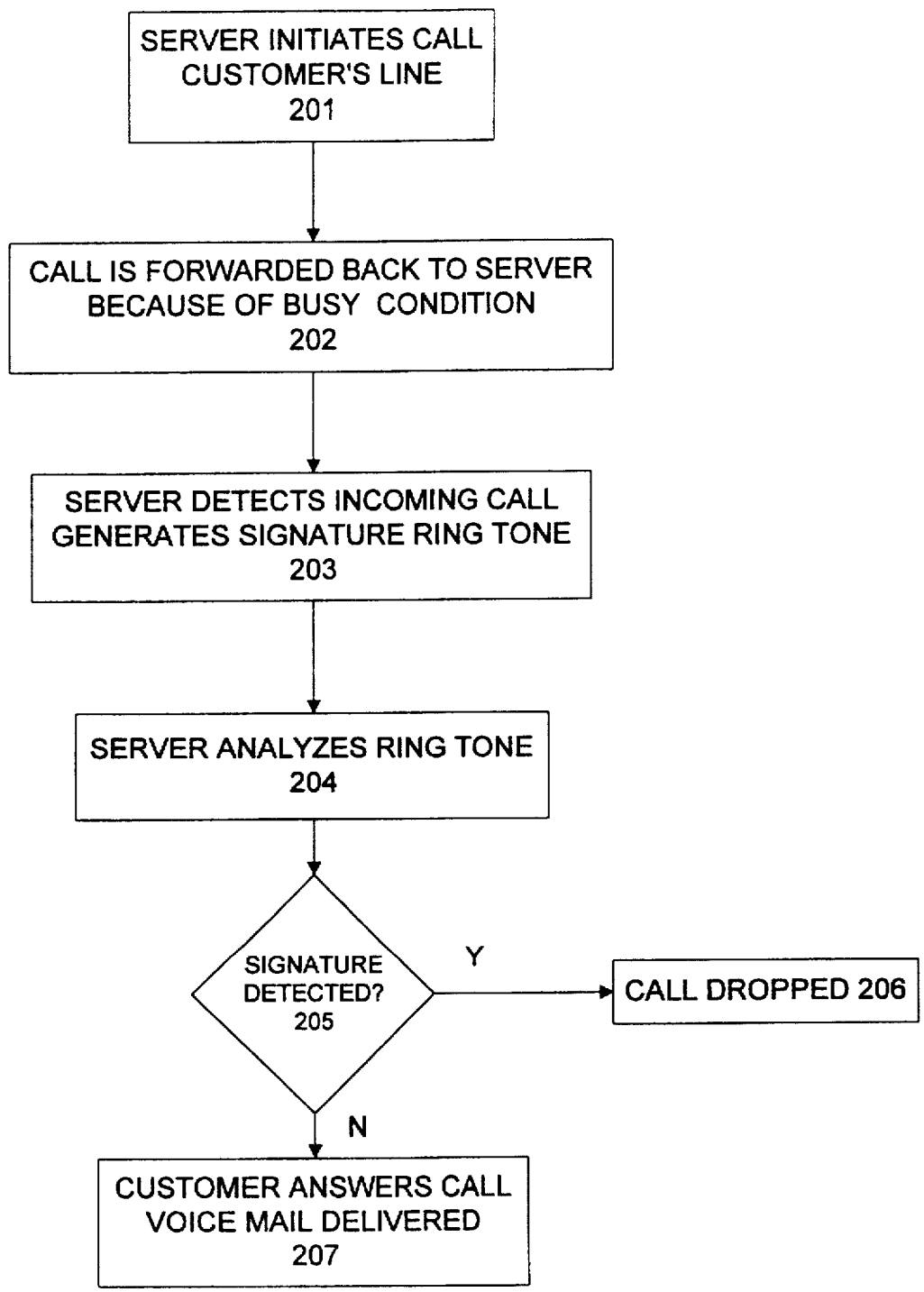
FIG. 2 is a flow chart showing in detail the implementation of the busy test utilizing a ring-back signature according to the present invention.

FIG. 2 shows the logic flow for detecting loop-back utilizing a ring-back signal incorporating a unique signature. Once a call has been forwarded to the server at 104 because the customer's line is busy (as described above), the server, under control of the retry schedule, initiates a call to the customer's line at 201. If the customer's line is still busy, the call will be forwarded back to the server by the local phone company at 202. The server, upon detecting an incoming call, generates a ring-tone with a unique signature at 203 consisting of a sequence of bits which can be detected by either digital or analog circuitry. The port on the server which originated the call to the customer's line (the "originating port") now hears the ring-tone at 204 and analyzes it to see if the unique signature is present at 205. If the signature is detected at 205, the originating port on the server hangs up and drops the call at 206. If the originating port does not hear the signature in the ring-back, it knows that the customer's line is now free and the customer is answering the call. The message is transmitted to the customer at 207 and the process is complete.

Figure 3:
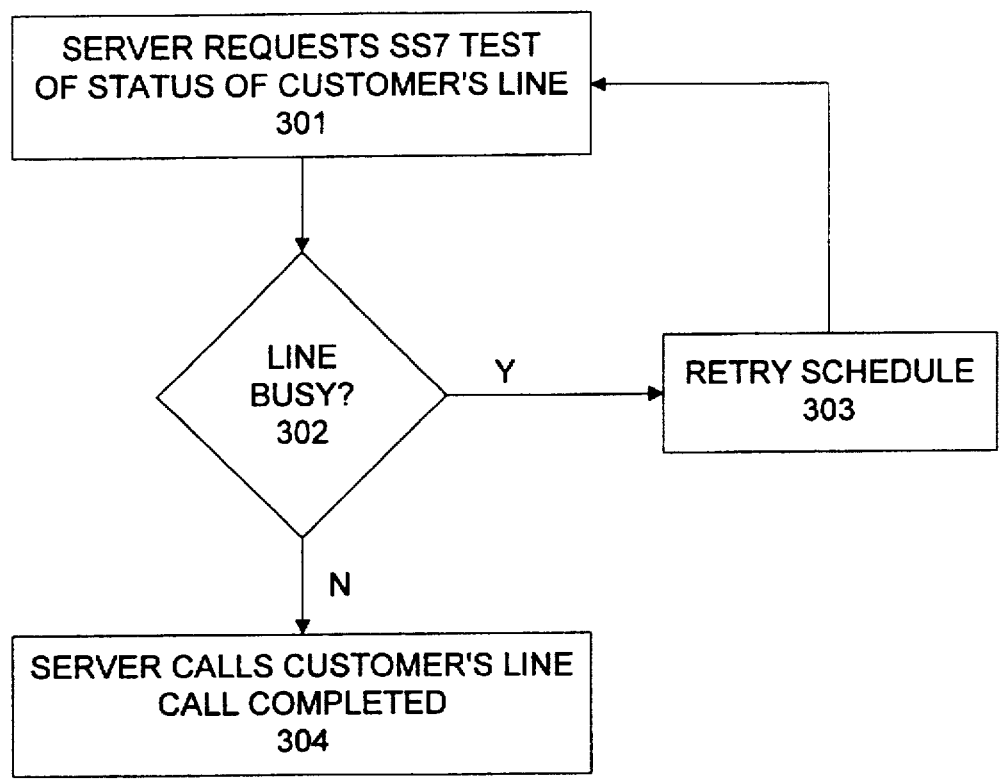
FIG. 3 is a flow chart showing in detail the implementation of the busy test utilizing SS7 to repeatedly test the status of the destination line, according to the present invention.

FIG. 3 shows how loop-back can be avoided using SS7 to test the status of the customer's line before attempting to deliver a stored message. The server sends a request to an SS7 server at 301 requesting the status of the customer's line. SS7 returns a busy/not busy response at 302. If the line is busy, the retry schedule at 303 waits a predetermined amount of time, and then repeats the request to the SS7 server. If the line is found to be not busy, then the server calls the customer's line and delivers the message at 304.

Figure 4:
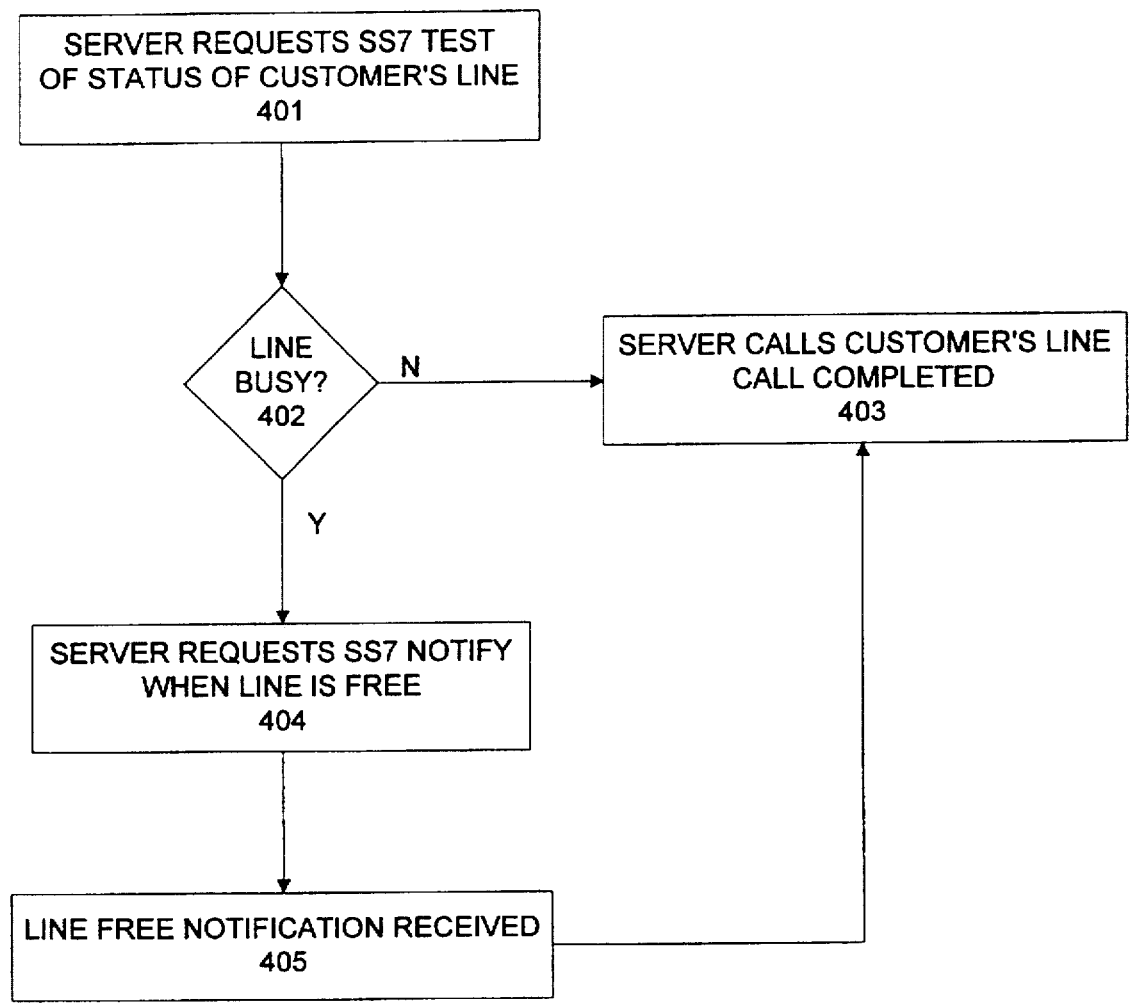
FIG. 4 is a flow chart showing in detail the implementation of the busy test utilizing SS7 to notify the server when the destination line is free.

FIG. 4 shows another embodiment using a different feature of SS7 in which SS7 notifies the server when the customer's line is free, avoiding the necessity of a retry schedule. As in FIG. 3, the server first requests the status of the customer's line at 401. If the line is not busy at 402, then the server initiates a call to the customer's line and completes the delivery of the pending message at 403. If the line is busy at 402, then the server requests SS7 to notify it at 404 when the customer's line is free. When the line-free notification at 405 is received by the server, the server initiates a call to the customer's line at 403 and the message is delivered.

Figure 5:
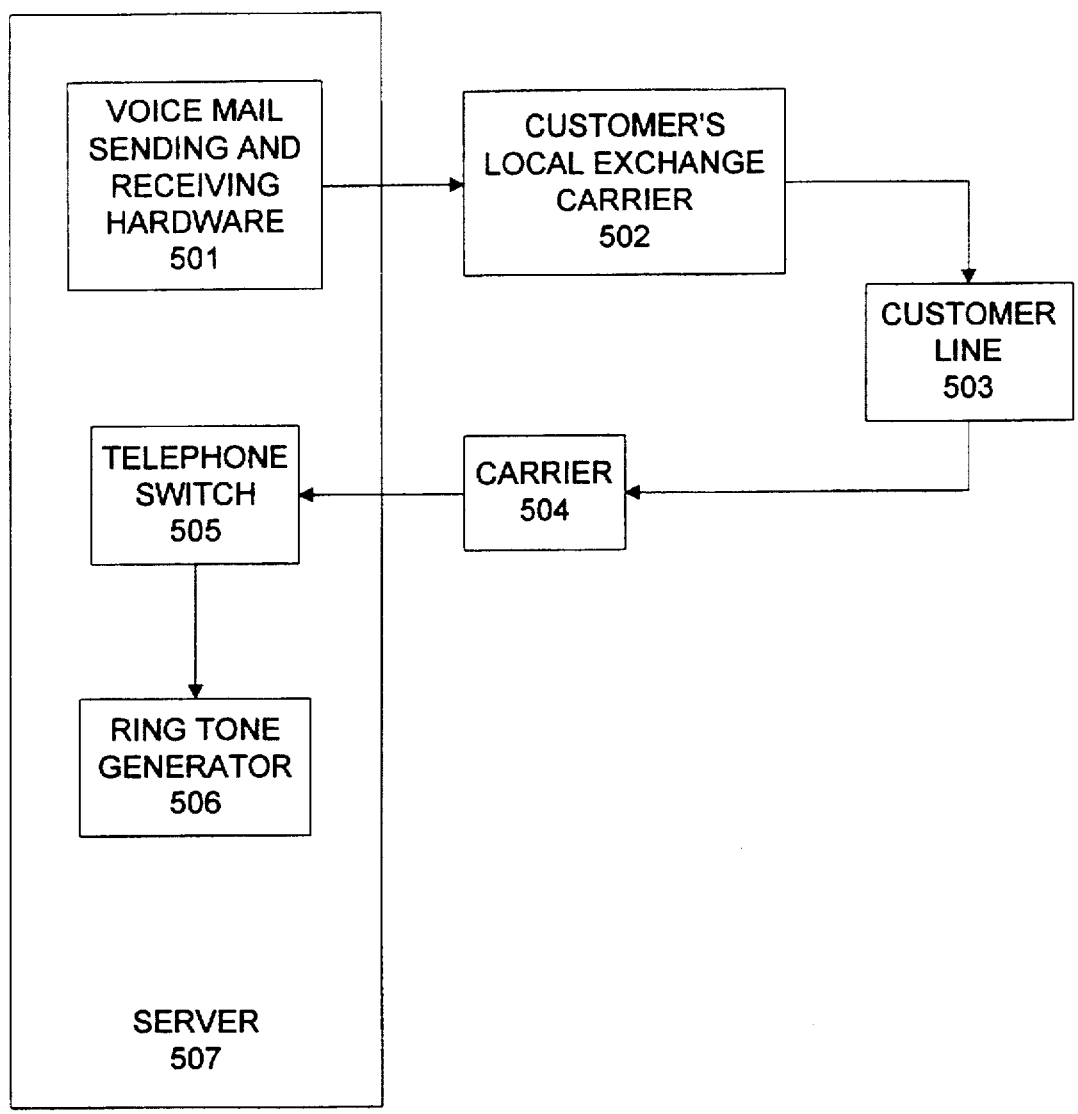
FIG. 5 is a block diagram of the various components necessary to implement proactive voice mail service utilizing a unique ring tone signal.

FIG. 5 shows a block diagram of the server and the phone network that transmits a call from the server to the customer's phone line and then back to the server. The server 507 employs voice mail sending and receiving hardware 501 that dials the customer's phone line. The customer's local exchange carrier 502 detects that the customer's phone line 503 is busy and the call is forwarded to a phone number for the server. The call at this point may be handed off to a carrier 504 that delivers the call back to the server's internal phone switch 505. In the case where the customer and the server were in different cities, the call from the customer's local exchange to the server would be directed to a toll-free number which would be carried back to the server by a long distance carrier 504. Upon receiving an incoming call, the phone switch 505 connects the incoming call to a ring tone generator 506. The ring tone from the ring generator then travels back through the network to the voice sending hardware where the ring tone can be detected. The ring tone generator is a commercial digital signal processor which is capable of producing a ring tone which consists of a prerecorded sequence of bits. These bits comprise a signature which can be recognized either digitally or by analyzing the spectrum and duration of the ring tone. The voice sending hardware includes a ring tone analyzer (explained in FIG. 6 below) which can be a similar commercial digital signal processor. The ring tone generator is programmed to generate the ring tone for about 3 seconds which is sufficient time for the voice sending hardware to detect the presence of the ring tone signature, disconnect the call, and for the disconnect signal to ripple through the phone network until the phone line calling the server 507 is also dropped. This process is explained in more detail in FIG. 6 below.

Figure 6:
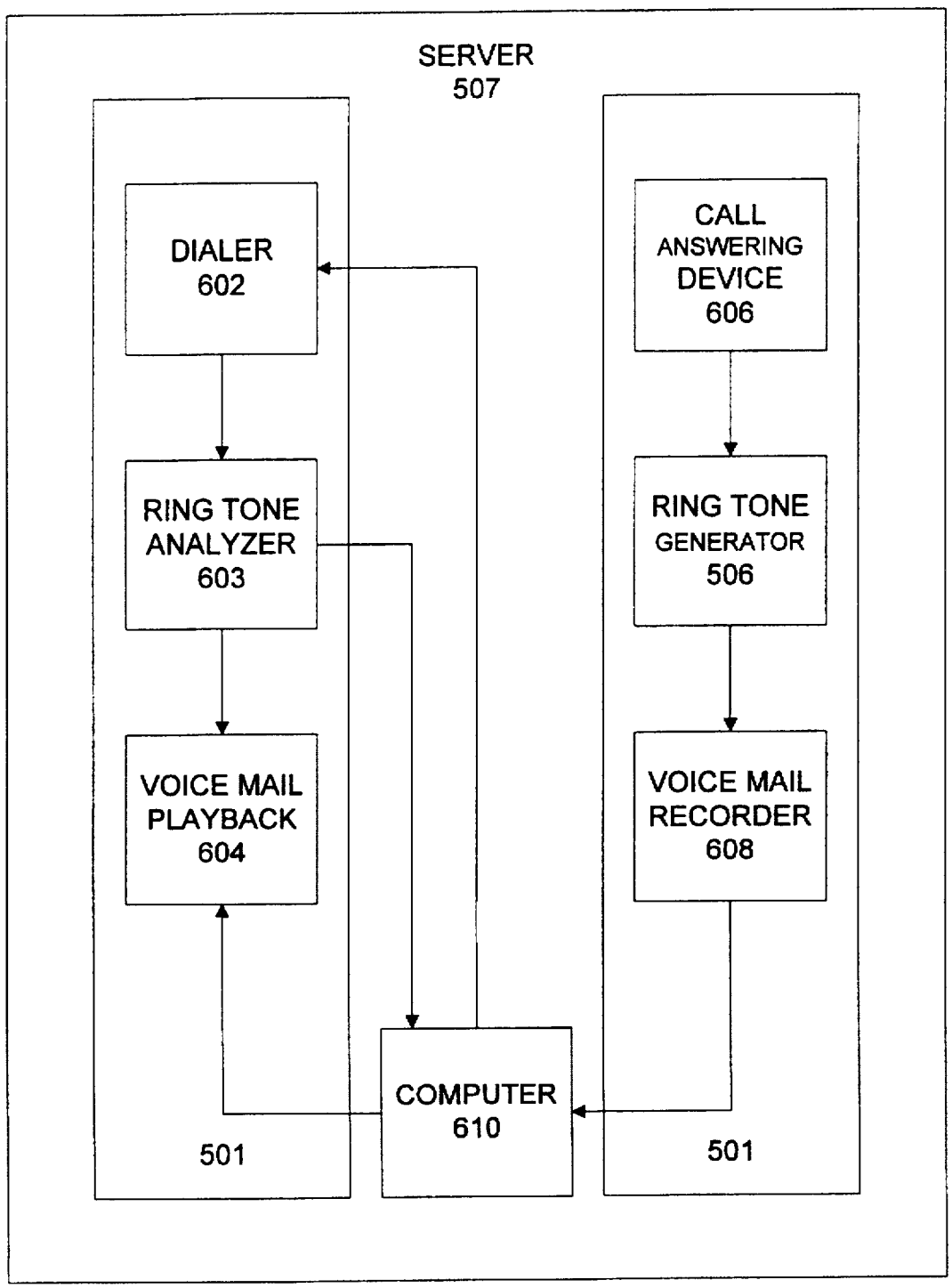
FIG. 6 is a detailed block diagram of the voice mail server of FIG. 5 showing the components of the server for implementing proactive voice mail service using a unique ring tone signal.

FIG. 6 shows the server 507 in more detail. The voice mail sending hardware of 501 consists of three main components: a dialer 602, ring tone analyzer 603, and voice mail playback hardware 604. The receiving hardware of 501 of the server 507 comprises a call answering device 606, the ring tone generator 506, and voice mail recorder 608. The entire server 507 is controlled by a computer 610. The computer commands the dialer to make a call to the customer's phone line. When the incoming call is received, the ring tone generator produces the signature ring signal for approximately 3 seconds. Meanwhile, the voice sending hardware has connected the ring tone analyzer to the outgoing line. If the ring tone analyzer hears the server's signature in the incoming ring tone, it disconnects the incoming call without answering the call (defined as an "off hook" signal to the phone company which causes billing to begin). This disconnect ripples through the phone network and causes the outgoing line to be dropped. If the ring tone analyzer does not hear the signature in the ring tone, it assumes that it has actually reached the customer and begins transmitting its stored message to the customer when the customer answers. On the incoming side of the server, if the incoming line is still active after 3 seconds of ringing, it can be assumed that the caller is not the server because the server would have disconnected immediately upon hearing the signature. Consequently, the incoming call is routed to the voice mail receiving hardware which answers the call, thus beginning the billing process, and receives the incoming message. The incoming message is stored on the computer's hard disk, along with the phone number from which the message was forwarded.

It is understood that the embodiments described hereinabove are merely illustrative and are not intended to limit the scope of this invention. It is realized that various changes, alterations, rearrangements, substitutions and modifications can be made by those of skill in the art without substantially departing from the spirit and scope of the present invention.

What is claimed is:

1. A method of providing voice mail service, comprising the steps of:

activating a forward on busy or a forward on busy/no-answer service on a customer's telephone line to forward calls to the customer's telephone line to a server;

receiving a call at the server forwarded from the customer's telephone line and storing voice mail at the server;

calling the customer's telephone line according to a retry schedule using a ring-back tone with an imbedded electronic signature that uniquely identifies the server;

analyzing ring-back tones received by the server when calling the customer's telephone line to detect if the electronic signature is present; and disconnecting a telephone call to the customer's telephone line made according to the retry schedule if the unique signature is detected or transmitting the stored voice mail from the server to the customer's telephone line if the electronic signature is not detected and the customer answers the telephone call made according to the retry schedule.

2. The method according to claim 1, wherein the identity of the customer's telephone line is recognized by the server by utilizing feature group D.

3. A method of providing voice mail service, comprising the steps of:

activating a forward on busy or a forward on busy/no-answer service on a customer's telephone line to forward calls to the customer's telephone line to a nationwide toll free telephone number which terminates at a server;

utilizing automatic number identification to determine the telephone number from which a call is forwarded to the server;

receiving a forwarded call from the customer's telephone line and storing voice mail at the server with the determined telephone number; and transmitting the stored voice mail from the server to the determined telephone number when the customer's telephone line is free and the customer answers by calling the customer's telephone line according to a retry schedule using a ring-back tone with an imbedded electronic signature that uniquely identifies the server;

analyzing ring-back tones received by the server when calling the customer's telephone line to detect if the electronic signature is present; and disconnecting a telephone call to the customer's telephone line made according to the retry schedule if the unique signature is detected or transmitting the stored from the server to the customer's telephone line if the electronic signature is not detected and the customer answers the telephone call made according to the retry schedule.

* * * * *